United States Patent [19]
Charlson et al.

[11] Patent Number: 5,603,256
[45] Date of Patent: Feb. 18, 1997

[54] BARBECUE GRILL

[75] Inventors: James L. Charlson, Freeport; Frederick A. Mather, Pearl City; Dale M. Peacock, Freeport; Algerd Churas, deceased, late of Pearl City, all of Ill., by Lois A. Churas, executrix

[73] Assignee: The Thermos Company, Freeport, Ill.

[21] Appl. No.: 423,311

[22] Filed: Apr. 18, 1995

Related U.S. Application Data

[63] Continuation-in-part of Ser. No. 106,232, Aug. 13, 1993, abandoned.

[51] Int. Cl.$^6$ .............................. A47J 37/04; A47J 37/00
[52] U.S. Cl. ............................... 99/445; 99/446; 99/450; 99/400; 126/25 R
[58] Field of Search ............................ 99/422, 425, 444, 99/445, 450, 446, 400, 378; 219/443; 126/25 R

[56] References Cited

U.S. PATENT DOCUMENTS

| | | | |
|---|---|---|---|
| 3,010,383 | 11/1961 | Greene | 99/332 |
| 3,183,823 | 5/1965 | Grimshaw | 99/445 |
| 3,343,527 | 9/1967 | Manteris | 126/25 |
| 3,385,282 | 5/1968 | Lloyd | 126/25 |
| 3,527,154 | 9/1970 | Shaper et al. | 99/400 |
| 3,623,422 | 11/1971 | Marshall | 99/400 |
| 3,805,688 | 4/1974 | Gvozdjak | 99/425 |
| 3,882,767 | 5/1975 | Oyler | 99/339 |
| 3,938,431 | 2/1976 | Potvin | 99/425 |
| 3,959,620 | 5/1976 | Stephen, Jr. | 99/401 |
| 3,963,898 | 6/1976 | Tuckwell | 99/375 |
| 4,034,662 | 7/1976 | McLane | 99/445 |
| 4,089,258 | 5/1978 | Berger | 99/339 |
| 4,108,142 | 8/1978 | Barson | 126/41 R |
| 4,322,049 | 3/1982 | Holland et al. | 126/25 R |
| 4,428,281 | 1/1984 | Miller | 99/445 |
| 4,434,781 | 3/1984 | Koziol | 126/25 R |
| 4,598,634 | 7/1986 | Van Horn | 99/340 |
| 4,817,514 | 4/1989 | Hitch | 99/419 |
| 4,878,477 | 11/1989 | McLane | 126/41 R |
| 4,917,006 | 4/1990 | Bowen | 99/331 |
| 4,924,766 | 5/1990 | Hitch | 99/421 HV |
| 4,979,437 | 12/1990 | Glebel | 99/345 |
| 5,009,151 | 4/1991 | Hungerford | 99/445 |
| 5,105,725 | 4/1992 | Haglund | 99/446 |
| 5,163,358 | 11/1992 | Hanagan et al. | 99/339 |

*Primary Examiner*—David Scherbel
*Assistant Examiner*—Reginald L. Alexander
*Attorney, Agent, or Firm*—Schiff Hardin & Waite

[57] ABSTRACT

A barbecue grill for cooking food includes: a firebox, the firebox including angled lower walls for draining liquids coming from the food; a grease channel, connected to the lower portion of the firebox, for directing grease outside of the firebox; a cover pivotally attached to the firebox; a cooking surface removably placed at the top of the firebox and securely held therein. Also provided in certain and alternate embodiments of the invention are one or more gas burners mounted in any of several orientations within the firebox, an electric cooking plate, a rotisserie, and a retaining means for securing a fuel supply tank.

11 Claims, 14 Drawing Sheets

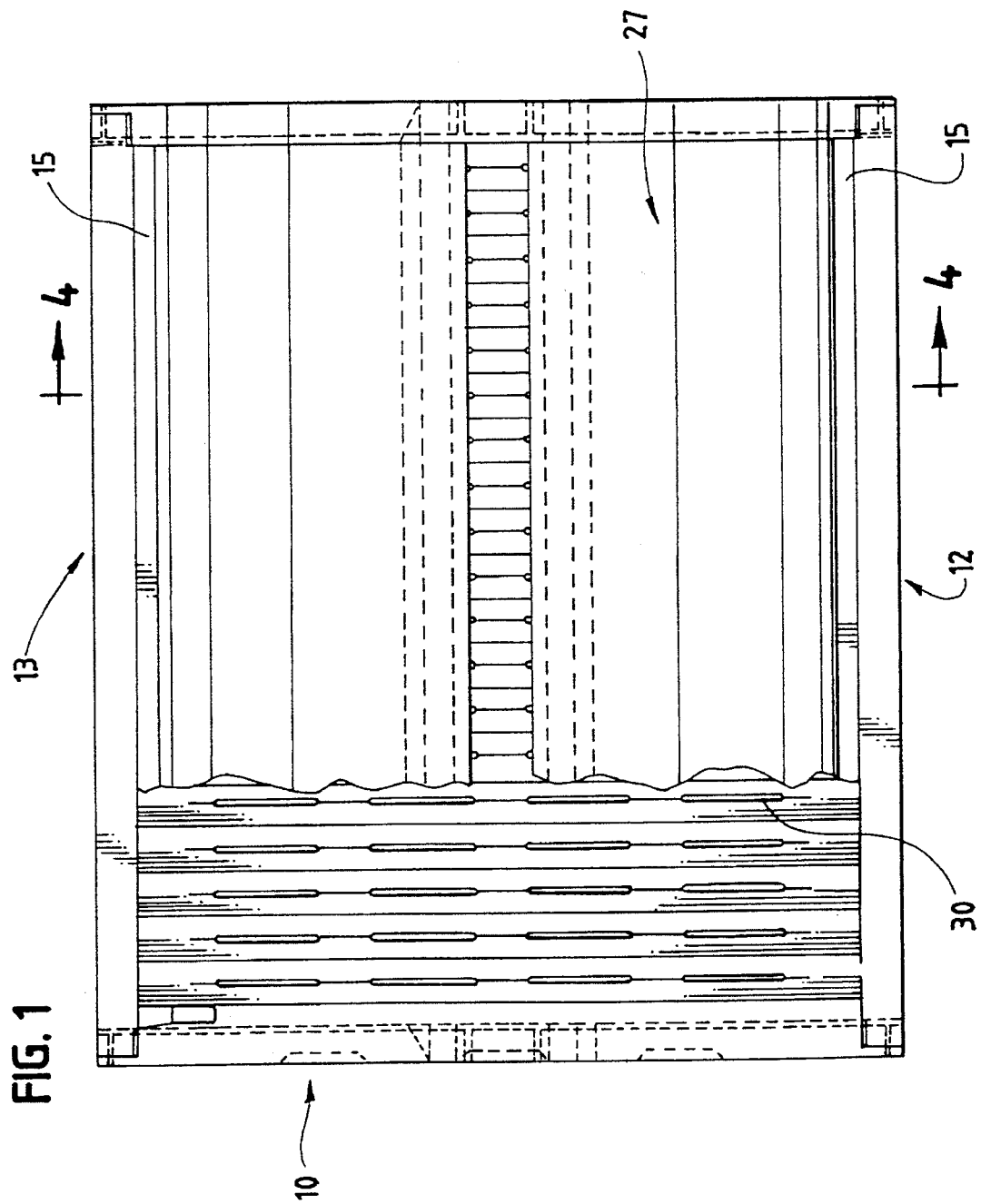

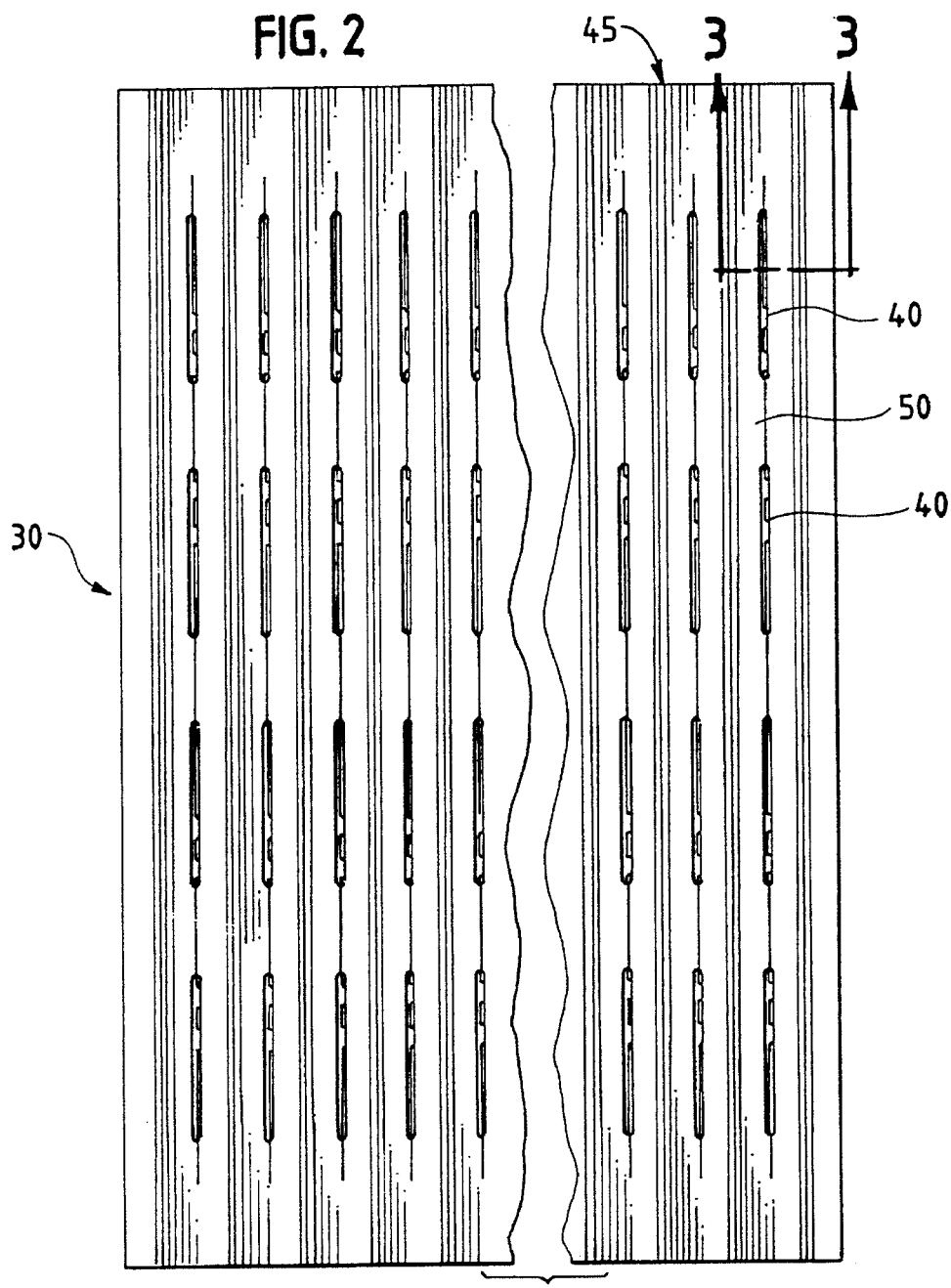
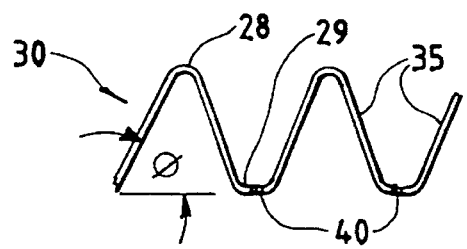

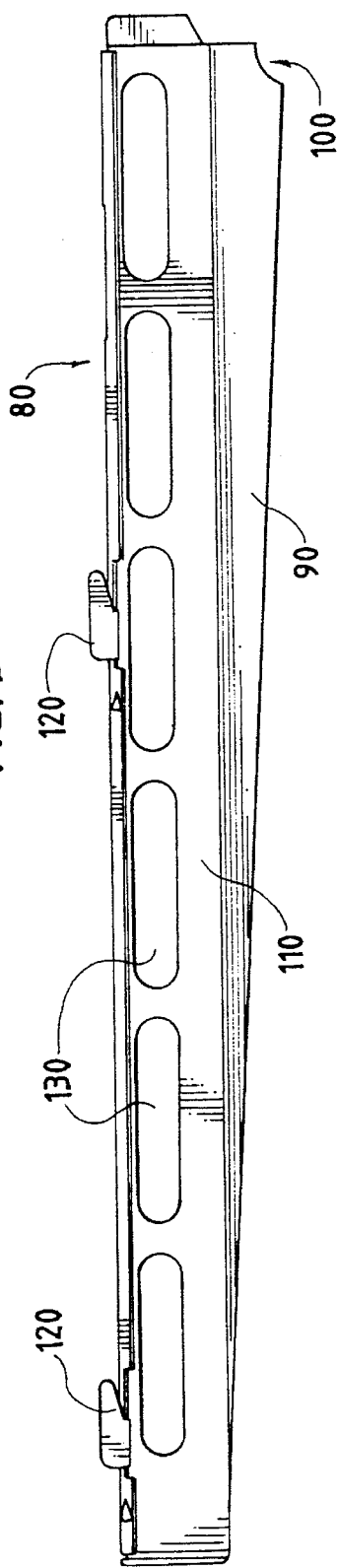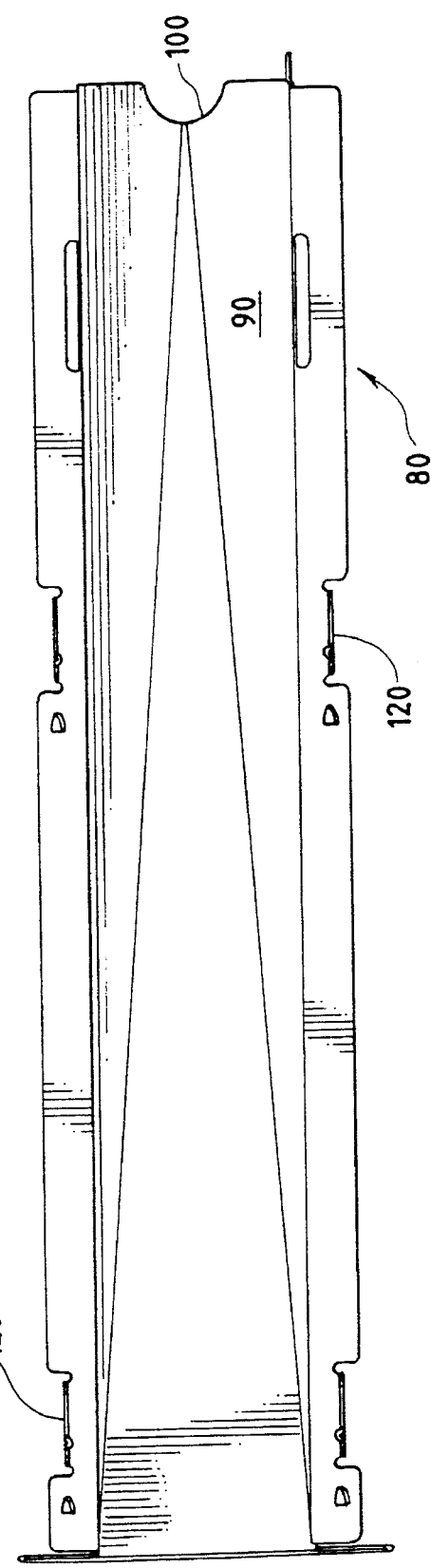

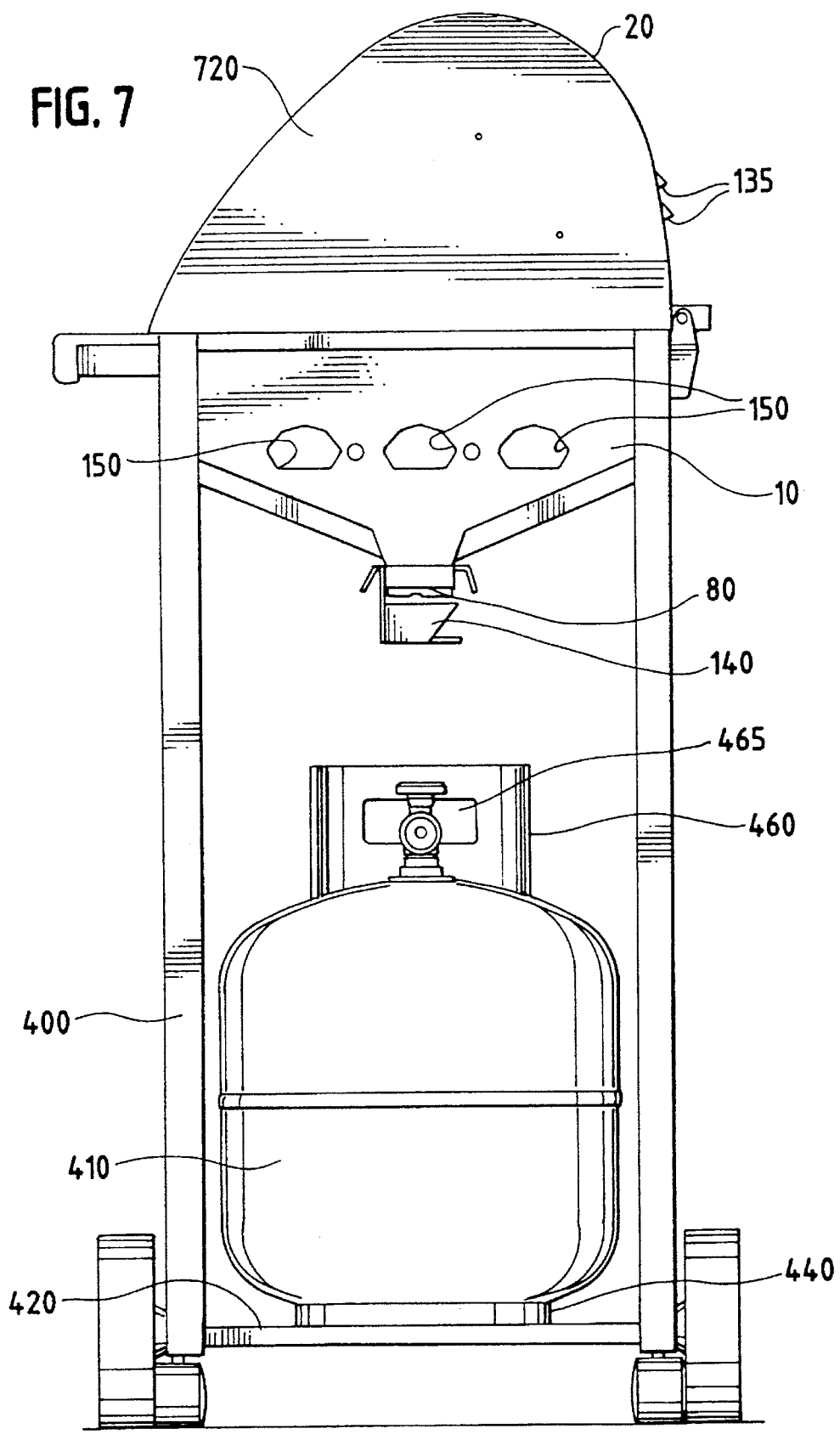

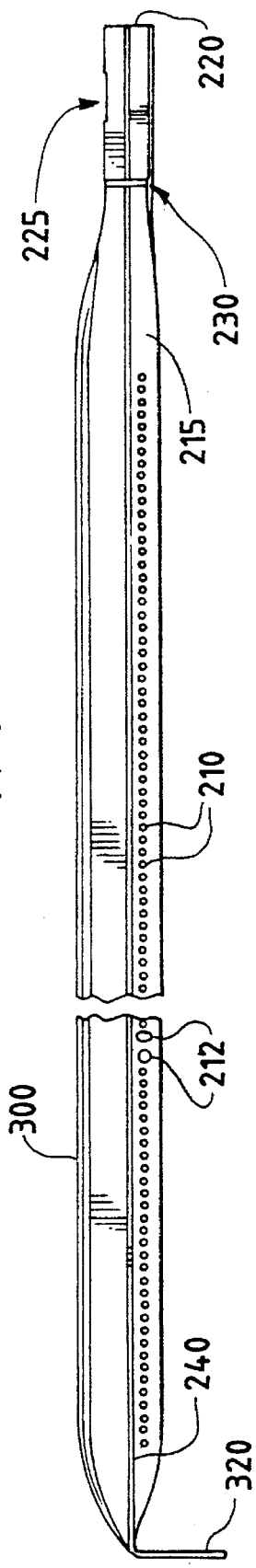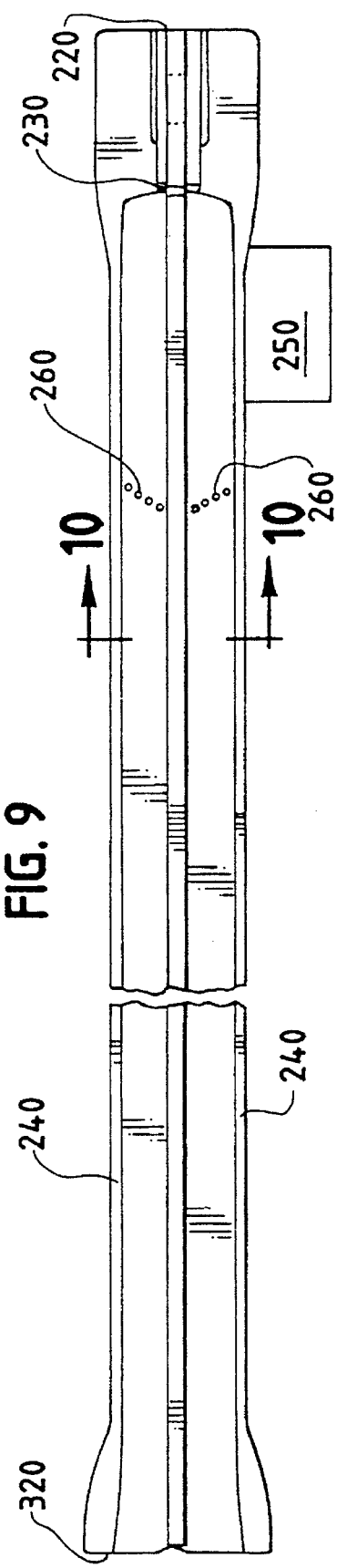

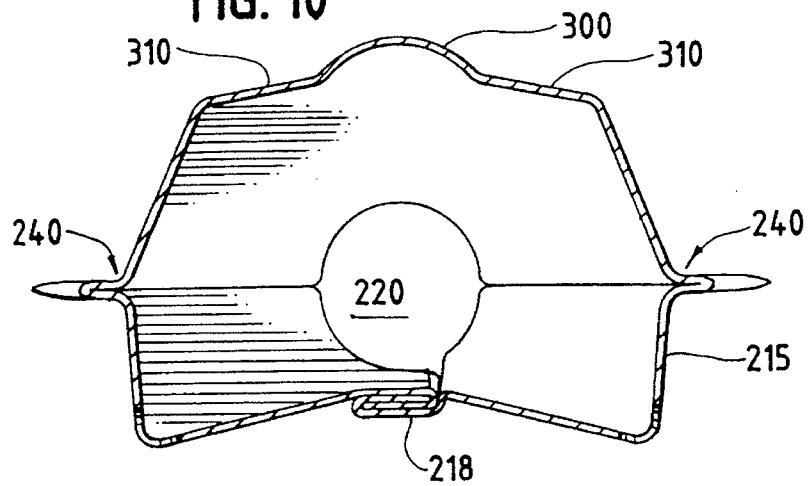
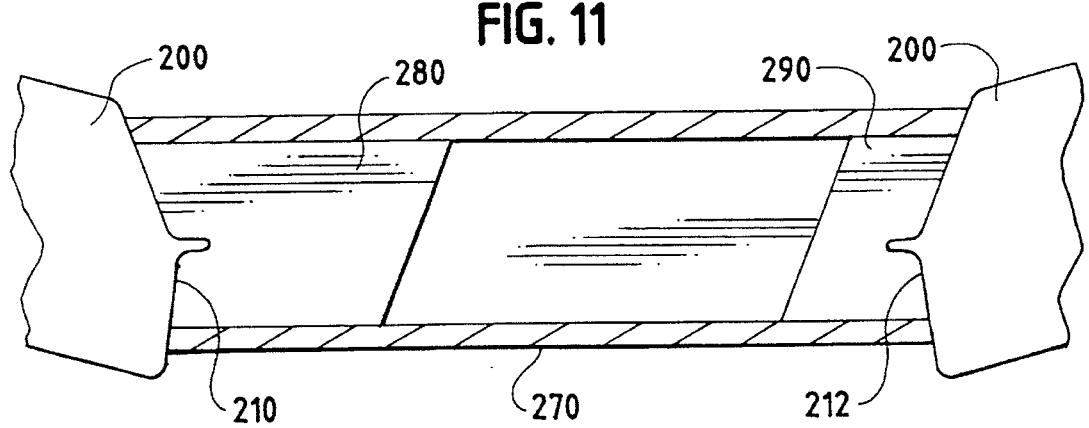

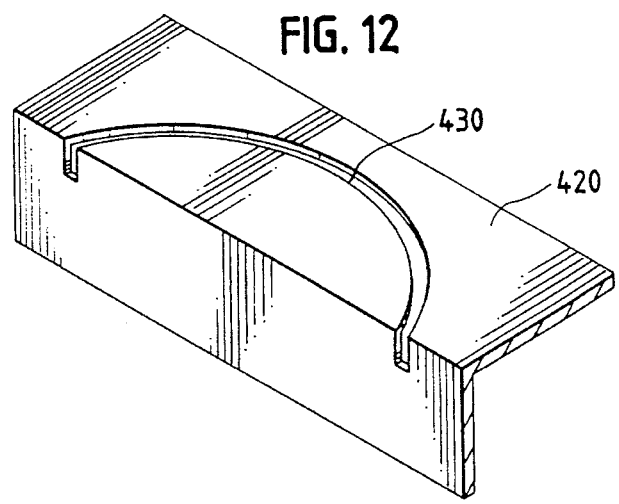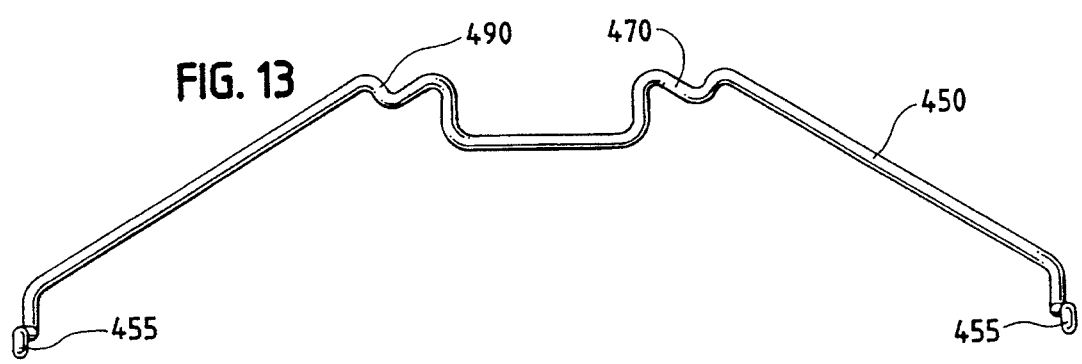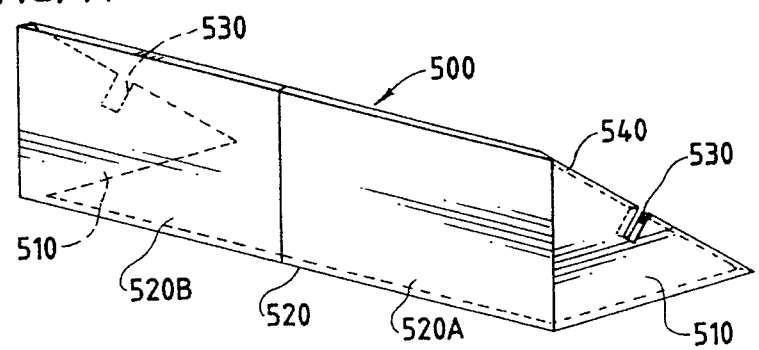

BARBECUE GRILL

CROSS-REFERENCE TO RELATED APPLICATION

This application is a continuation-in-part of patent application Ser. No. 08/106,232 filed on Aug. 13, 1993, now abandoned.

The present invention relates to original and advantageous elements of barbecue grills and to the method of making those elements, and also the method of making a grill incorporating some or all of those elements.

BACKGROUND OF THE INVENTION

Barbecue grills have been popular for many years with backyard and patio chefs. These grills typically have been heated by charcoal briquettes or by fuel gas. In recent years, portable grills heated by a fuel gas source, such as a propane tank, have become increasingly popular. These gas grills combine the convenience of portability with the use and thermal efficiency of propane, which eliminates the need for lighter fluid, new charcoal at each use, and charcoal disposal.

Portable gas grills typically include a cart, with two or four wheels, that supports a cooking housing. The cooking housing typically consists of a firebox, a cover, and a burner near the bottom of the firebox. It also includes a grate for holding socalled "lava rocks" (pumice stone), a heat distribution plate, or an apparatus that shields the burner tubes from grease drippings and simultaneously vaporizes drippings falling on to the apparatus. That plate or apparatus is typically spaced above the burner in the firebox, and a metal wire cooking grid is positioned well above the plate or apparatus for holding the food to be cooked. Portable gas grills include a portable fuel tank supported by the cart, below the firebox. Features often found on portable grills include side burners for cooking or warming food; warming racks positioned above and to the rear of the cooking grid; rotisserie devices for cooking on a spit above the cooking surface; and condiment racks for holding spices, sauces, and other useful condiments.

Lava rock grates, heat distribution plates and vaporizing structures each act as barriers to the heat transfer from the gas burners at the bottom of the grill lower housing to the cooking grid. It is an object of the present invention to remove these structures, or any other structures, between the burner and the cooking surface and thereby increase heat transfer efficiency. The burner in the present invention is also placed substantially closer to the cooking surface than burners in the prior art. As a consequence of the burner's proximity to the cooking surface and the removal of heat barriers, the heating efficiency of the present invention is significantly increased.

It is another object of the invention to provide a burner shaped to vaporize grease, spread out the flame for even heat distribution, and allow grease to run off the tube without clogging the burner holes in the tube.

It is another object of the invention to provide burner tubes that are easy to insert into and remove from the firebox.

It is another object of the invention to provide a structure for propagating flames from one burner tube to another burner tube parallel to the first burner tube that does not create a "hot spot" in the grill cooking surface.

Portable gas grills are typically constructed out of cast aluminum. One object of the present invention is to provide an improved method of manufacture for the grill housing, cart, and burner, through the use of roll-forming technology. The use of roll-forming allows for the manufacturing and marketing of different-sized grills and grill parts without re-tooling of the manufacturing process.

It is another object of the invention to provide a cooking surface with crests and troughs, and apertures in the troughs, to optimize heat transfer and to allow for improved flow of grease drippings, and to contain flare-ups below the cooking surface.

It is another object of the invention to decrease the frequency of grease fires by the general placement of exhaust vents or apertures in the upper portion of the walls of the grease-catching structure located beneath the firebox.

It is another object of the invention to provide an improved rotisserie device for use with the barbecue grill described herein.

Other objects and advantages of the invention will become apparent to those skilled in the art by reference to the accompanying description and drawings.

SUMMARY OF THE INVENTION

The present invention achieves such objects by providing a barbecue grill for cooking food comprising a firebox, the firebox including angled lower walls for draining liquids coming from the food; a grease channel, connected to the lower portion of the firebox, for directing grease outside of the firebox; a cover pivotally attached to the firebox; and a cooking surface removably placed at the top of the firebox and securely held therein. Also provided in certain and alternate embodiments of the invention are one or more gas burners mounted in any one of several configurations, an electric cooking plate, a rotisserie, a retaining means for securing a fuel supply tank, and other innovative features.

BRIEF DESCRIPTION OF THE DRAWINGS

FIG. 1 is a top and partial cut-away view of the firebox of the grill of the invention.

FIG. 2 is a top view of a cooking grid used in one embodiment of the invention.

FIG. 3 is a partial cross-sectional view of the cooking grid shown in FIG. 2.

FIG. 5 is a side view of one segment of a grease channel used in an embodiment of the invention.

FIG. 6 is a bottom view of the grease channel shown in FIG. 5.

FIG. 7 is an end view of one embodiment of the grill of the invention shown installed on a cart.

FIG. 8 is a side view of a burner embodying an aspect of the present invention.

FIG. 9 is a bottom view of the burner shown in FIG. 8.

FIG. 10 is a cross-sectional view of the burner shown in FIGS. 8 and 9.

FIG. 11 is a side view of an embodiment of a flash-tube made in accord with the invention.

FIG. 12 is a perspective view of a cross-member of the cart made according to the invention.

FIG. 13 is a top view of a wire retainer used in the invention.

FIG. 14 is a perspective view of a rotisserie made according to another aspect of the invention.

DETAILED DESCRIPTION OF THE INVENTION

The grill of the present invention incorporates a number of elements that, individually and in combination, represent an advance in the art.

Figure 15:
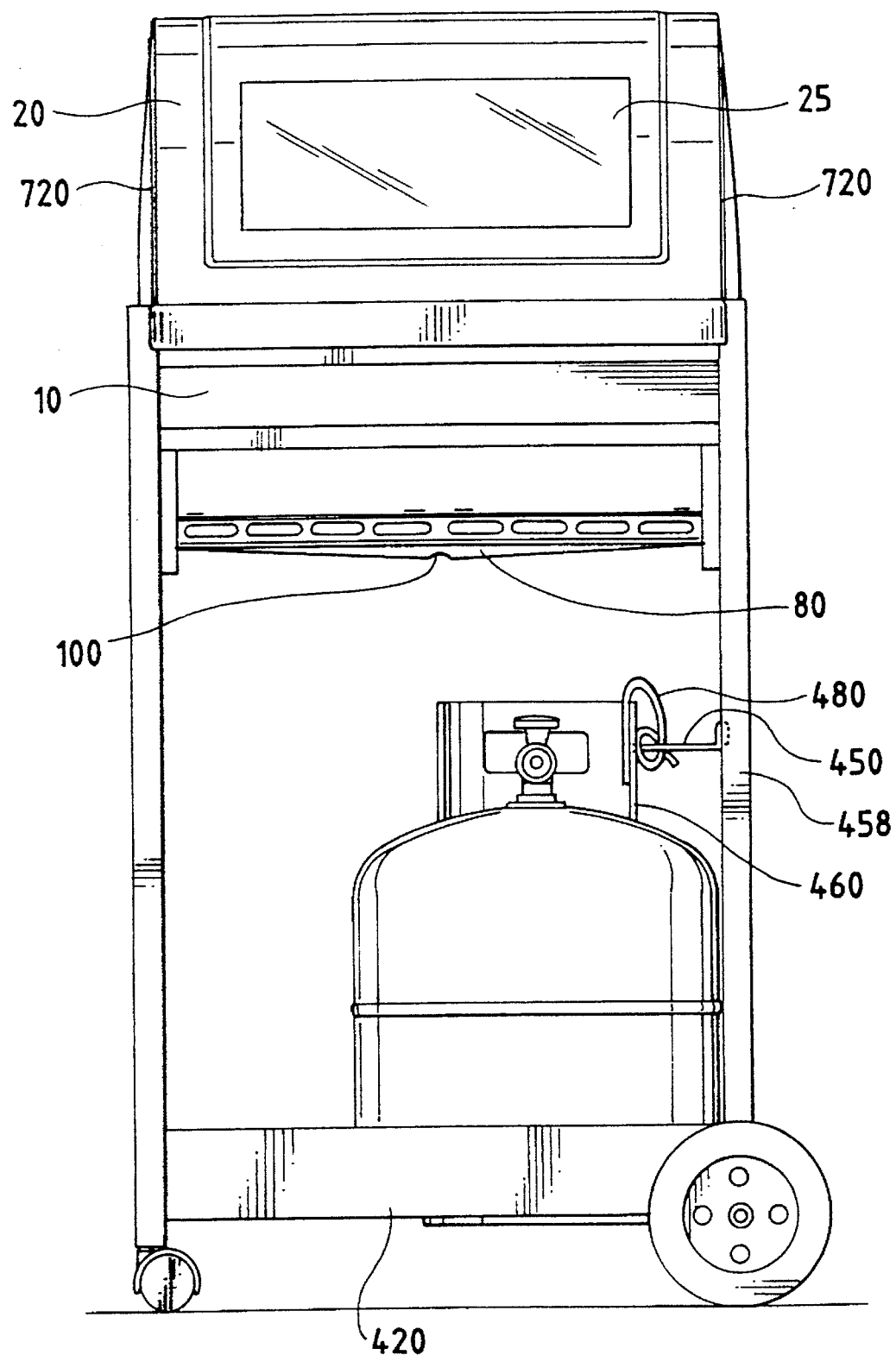
FIG. 15 is a frontal view of the grill of the invention shown installed on a cart.

According to the present invention, as shown best in FIG. 15, a grill comprising a firebox 10 and a cover 20 is provided, the cover preferably being pivotally attached to the firebox at rear side 13 (as shown better in FIG. 1). Referring to FIG. 1, the firebox 10 includes a step portion 15 designed to accommodate a removable cooking grid 30 that rests at its uppermost portion approximately level with the top of the firebox 10. Firebox 10 and cover 20 are preferably made from a metal having a heat-insulating capacity greater than the cast aluminum used in most conventional grills, thereby reducing energy loss through the top and side portions of the grill. At the same time, it is desirable to keep the weight of the grill, and especially the cover 20, similar to that of conventional grills to facilitate use by persons of even less than ordinary strength. Thus, cover 20, and desirably, firebox 10, are fabricated from rolled steel sheet that is aluminized to provide weather resistance. The use of aluminized rolled steel sheet of 22 gauge thickness has been found to reduce energy loss through the cover 20 and firebox 10 by about twenty percent. The cover 20 may optionally include a tempered or heat-resistant glass window 25 for viewing the food being cooked without requiring that the cover be opened, and heat lost as a result.

Cooking grid 30, as shown in FIGS. 2 and 3, is made from a metal, preferably porcelainized or enameled iron, and may be provided in one or more sections across the length and width of opening 27 in the top of firebox 10. The grid 30 is made integrally of numerous, interconnected segments 35 that together describe a generally triangular or sinusoidal waveform cross-section having crests 28 and troughs 29. Grid 30 also includes one or more apertures 40 at the base of preferably each trough 29. The angle 8 of each segment 35 of the waveform from horizontal should be steep enough to permit cooking grease and other liquids from the food being grilled to drain through apertures 40 in grid 30 and into firebox 10. An angle α of about 60 degrees has been found to be particularly efficacious. The spacing and height of crests 28 and troughs 29 on grid are selected to minimize contact with food while at the same time supporting and protecting food from flareups. Preferably, the grid is oriented in the firebox such that the crests 28 and troughs 29 extend from the front 12 to the back 13 of the firebox.

Figure 20:
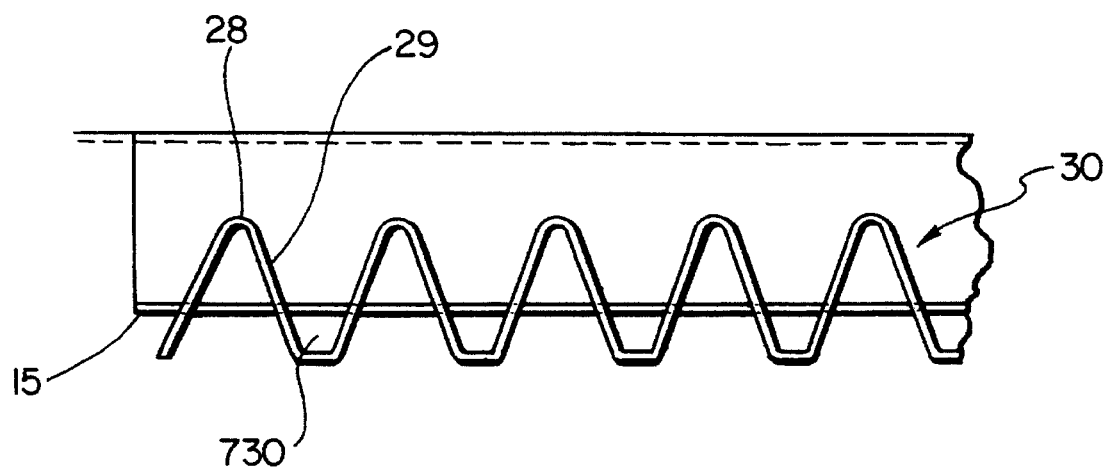
FIG. 20 is a partial end-view of an alternative embodiment of the cooking surface.
Figure 21:
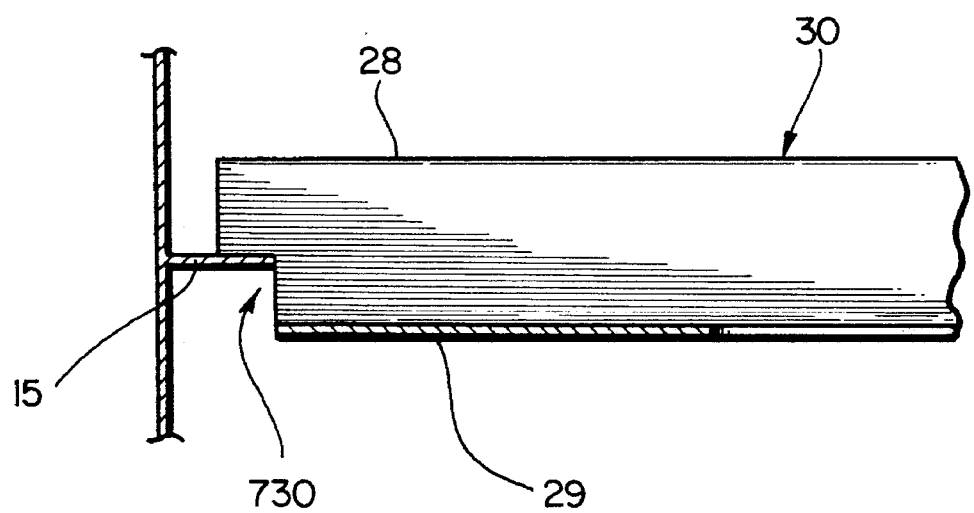
FIG. 21 is a partial cross-sectional view of the firebox shown in FIG. 1, configured for one embodiment of the invention.

In a second embodiment, the cooking grid 30 as shown in FIGS. 20 and 21 has a notch 730 cut out of the trough 29 portion of the cooking grid 30. Thus, when the cooking grid 30 is placed on step portion 15, the notch 730 causes the trough 29 portion to be situated below the level of the step portion. In this configuration, the trough portions 29 at the ends of the cooking grid 30 open into the firebox. This allows food particles left in the cooking grid to be scraped off and discarded directly into the firebox, thereby eliminating the inconvenience of having to manually remove food particles from the cooking grid 30.

It has been found desirable to provide sufficient grid surface 50 between the apertures 40 to permit cooking liquids and grease to collect on surface 50, where they will evaporate or burn and thereby enhance the flavor of the foods being cooked. Thus, apertures have not been provided on the angled walls of the grid surface 50.

Figure 4:
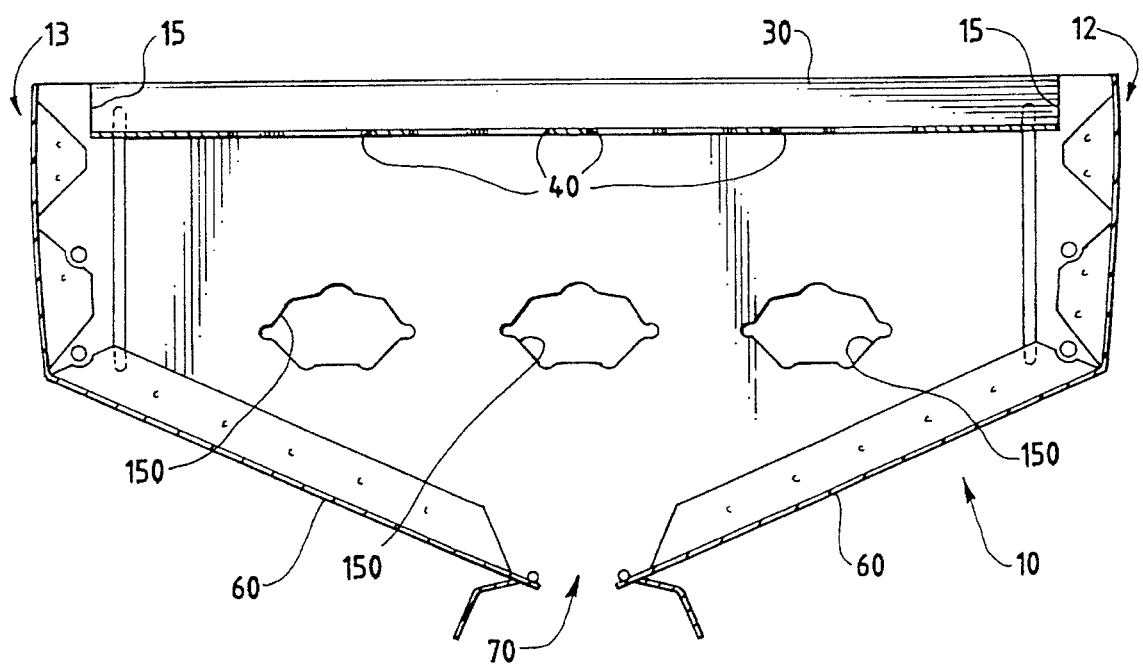
FIG. 4 is a cross-sectional view of the firebox shown in FIG. 1, configured for one embodiment of the invention.

As shown in FIG. 4, firebox 10 is provided with a cross-section that includes angled wall portions 60. Some of the grease and other cooking liquids draining through apertures 40 in grid 30 fall onto wall portions 60, each of which extends nearly half the width of the firebox from the front 12 and back 13 toward the center. Wall portions 60 terminate before meeting at the center of the firebox, leaving a gap 70 between them.

Gap 70 is fitted with a grease channel 80, shown in FIG. 15, which is preferably removably mounted to firebox 10. Grease channel 80, preferably made from two symmetrically arranged, rolled steel (or other metal) segments, is provided with angled bottom 90 to direct grease and other cooking liquids dripping into channel 80 to aperture 100. Although in the embodiment shown in FIGS. 5 and 6, aperture 100 is located approximately in the center of the bottom of channel 80, it may be located at any point in channel 80 provided that the bottom 90 of the channel is angled to direct grease and other liquids toward aperture 100. Grease channel 80 may be connected to firebox 10 by mechanically interlocking tabs 120 that fit into corresponding slots at the bottom of firebox 10, or by any other method.

As shown best in FIG. 5, side walls 110 of grease channel 80 are provided with a plurality of perforations 130 to provide venting of air to firebox 10. Perforations 130 are preferably of such size, shape and location to optimize the quantity of outside air available in the firebox for combustion of propane or other fuel gas used by burners located in firebox 10, if any. Because of movement of air upward through the firebox as a result of heating, the location of perforations 130 along the upper portion of walls 110 of grease channel 80 minimizes the quantity of oxygen available for combustion in the region immediately proximate to the bottom of channel 80 where grease collects. In effect, the air streaming in through the perforations 130 creates a vacuuming action which causes the heated air to be drawn out of the grease channel 80, thereby starving the grease channel 80 area of oxygen. The lack of oxygen reduces the risk of fire resulting from the collection of grease.

As shown best in FIG. 7, the rear portion of cover 20 is also preferably provided with one or more louvers 135 cut from cover 20 to afford a site for smoke and combusted cooking air to exhaust from the grill.

Beneath aperture 100 in grease channel 80 there is provided a bracket 140, as shown in FIG. 7. (In FIG. 15, the bracket 140 is removed to show other features of the invention better.) Bracket 140 preferably is removably attached by a conventional tab-and-slot arrangement, or is permanently mounted, to firebox 10, but may alternatively be mounted or removably attached to grease channel 80 without departing from the invention. Bracket 140 is of sufficient size and shape to securely hold a pan or cup (not shown) to catch grease or other cooking liquids draining through aperture 100, and preferably is shaped to hold a disposable container such as any of several commercially available foil pans.

Firebox 10 includes, in one embodiment of the invention, at least one burner 200 (and preferably two burners) that is provided through a hole 150 in the firebox, as shown in FIGS. 1 and 7. If more than one burner 200 is provided in the firebox 10, it will be understood that more than one such hole 150 should be provided at a location suitable for the burner to be placed within the firebox to achieve the desired transfer of heat. As shown in FIGS. 8 and 9, each burner includes a plurality of gas ports 210 along a lower side portion 215 of the burner.

Burners 200 are formed from a strip of aluminized steel or other metal that is roll-formed to the desired shape, preferably as shown in FIGS. 8, 9 and 10. Prior to rolling the strip into the desired shape, gas ports 210 are die-stamped (or otherwise formed) at the desired intervals. The number and frequency of gas ports, and the size of each, will depend upon the desired heat transfer and the air mixture available for burning, and may be calculated from standard formulae available in reference texts. Cooking fuel enters each burner 200 through an opening 220 at one end, which is provided with a conventional fitting for connection (as by a flexible hose) to a gas valve and fuel supply.

In order to provide air to create an air/fuel mixture suitable for burning, each burner 200 is provided with a lateral opening 225 near the opening 220. Lateral opening 225 may be placed anywhere around the circumference of the burner, and in the preferred embodiment is placed opposite a lock-seam 218 produced by the roll-forming process. The size of lateral opening 225 is sufficiently large to permit the appropriate amount of air desirable to achieve a user-determined rate of combustion to be drawn into the burner. Air is drawn into the burner through the lateral opening 225 by providing a narrower venturi section 230 near and upstream of lateral opening 225 to increase the upstream rate of gas flowing through the burner upstream of opening, creating a pressure differential that entrains outside air. Preferably, lateral opening 225 is fitted with a fine wire mesh or other screening material (not shown) to permit air flow through lateral opening 225 while at the same time preventing insects and spiders from entering the burners and blocking the flow of gas through the burners.

In a first embodiment, burners 200 preferably are formed to include wings 240 to cover gas ports 210 and prevent grease and other cooking liquids from falling directly into the ports or into the flames formed at such ports. The control of such "flare-ups" is desirable to enhance the safety of grill operation, and to avoid unnecessary smoking and burning of the food being grilled.

Figure 19:
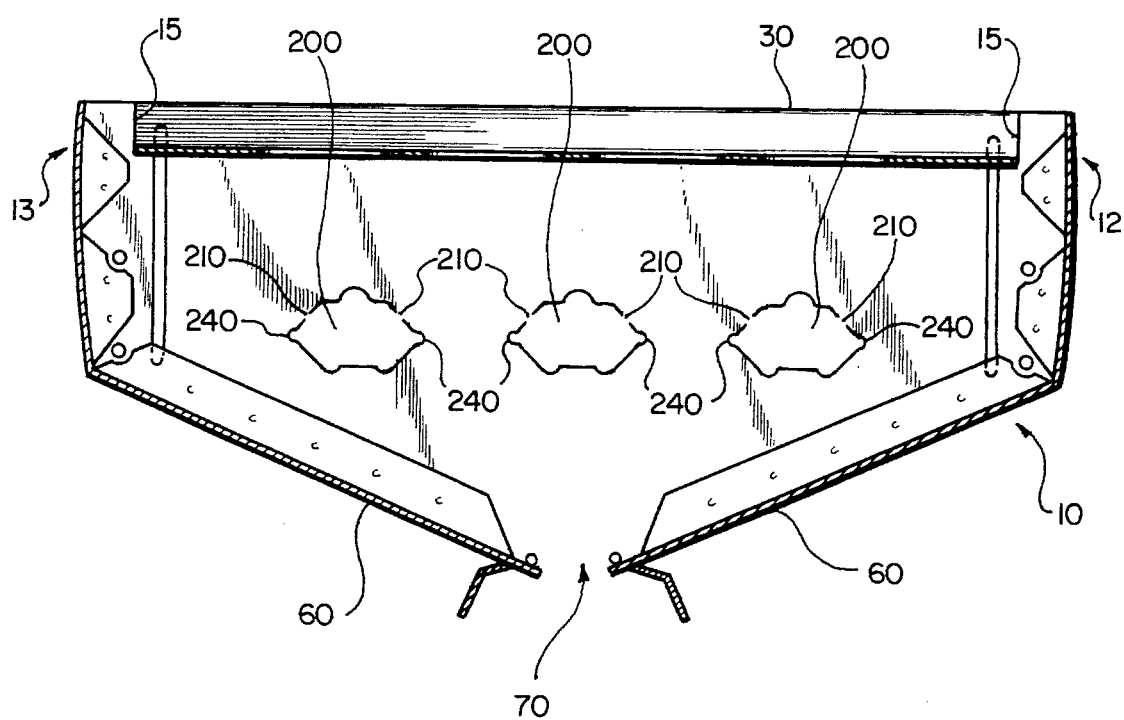
FIG. 19 is a cross-sectional view of the firebox, similar to FIG. 4 but showing an alternative embodiment of the grill.

In a second embodiment, as shown in FIG. 19, burners 200 may also be formed and oriented in the grill to include wings 240 located below the gas ports 210 to allow for greater amounts of gas to flow through the burner 200. This increased gas flow and combustion results in hotter temperatures and commensurately faster cooking times. The cooking grids minimize the possibly increased number of flare-ups from damaging the food.

At least one of the burners 200 is provided with an ignition means 250, such as a conventional piezoelectric ignition, to ignite the air/fuel mixture. In a preferred embodiment, the ignition means is placed adjacent to gas ports 210 at one end, and on one side, of the burner 200. In such an embodiment, flames are transmitted to the other side of the burner by slot or holes, such as holes 260, formed in the bottom of the burner.

In a two-burner grill, it is desirable to use a single ignition means as just described. In such a grill, one or more flash tubes 270 as shown in FIG. 11 are provided to transmit flames from one burner 200 to another. In the preferred arrangement, two such flash tubes 270 are provided along with two burners 200, each for transmitting flames from one burner to the other. Each flash tube includes a flame-transmitting section 280 and a gas-transmitting section 290, the latter of which is smaller than the former; both are cut from the side walls of each flash tube. At the same time, each burner is provided with one or more enlarged gas ports 212 adjacent to the gas-transmitting section 290 of the flash tube to provide preferential mass transfer of gas through the flash tubes.

In operation, when the user desires to ignite a second burner while a first burner is in operation, gas flows through the second burner and through enlarged gas ports 212 into the gas transmitting section 290 of a flash tube 270. The flame emerging from the first burner from gas ports located at the other end of the same flash tube, at its flame-transmitting portion 270, ignites the gas flowing through the flash tube from the gas-transmitting portion 290, and thereafter ignites the second burner. To enhance transfer of flames from one side of the second burner to the other, slots or holes 260 like those shown in FIG. 9 and described above are preferably provided.

Each burners 200 also preferably includes a ridge 300 on its upper surface to increase the heat transfer area of the tubes, more efficiently using the heat generated by combustion of the fuel gas flowing through the burner 200.

Because of more efficient fuel use, and because control of flare-ups is provided by the burner itself without the addition of any shielding apparatus as previously found in the art, the burners may be provided in closer proximity to the grid 30 than was permitted with conventional burners and cooking surfaces. This means that heat may be transferred to cooking grid 30 and food placed thereon with a minimum of heat loss to the atmosphere and the surrounding apparatus.

Upper surfaces 310 on the burners 200 are angled slightly downward and away from the longitudinal axis of each burner to direct grease drippings to wall portions 60 of firebox 10. Those upper surfaces 310 and wings 240 also provide heated sites where grease and other cooking liquids are vaporized to enhance the flavor of the foods beings cooked.

Roll-formed burners 200 also preferably have a flattened end section 320 that is bent to be secured by a slot (not shown) in the end of firebox 10 opposite hole 150. This provides for easy attachment of the burners to the firebox 10, as well as easy removal and replacement of burners within firebox 10 during cleaning of the firebox, or if the burners become soiled and unusable. Advantageously, because the burners can be placed closer to cooking grid 30 in the present invention than in conventional grills, cleaning of the firebox is made easier, as there is more room between the lower walls 60 of the firebox and the burners 200.

As shown in FIG. 7, firebox 10 may be mounted upon a cart 400 (which is preferably made of roll-formed steel or other metal) that includes a space for securely holding a fuel supply tank 410, such as a conventional propane gas tank. Cart 400 incorporates cross-member 420 (shown in FIG. 12) that includes slot 430, which describes a portion of the circumference of extension 440 found at the bottom of fuel supply tank 410 and is adapted to receive that portion of the extension. Cart 400 preferably also includes wire retainer 450 (shown in FIGS. 13 and 15) which engages upper extension 460 found at the top of fuel tank 410, so that kinks 470 in retainer 450 limit side-to-side and rotational movement of upper extension 460 and tank 410. Retainer 450 preferably is attached to the cart 400 by placing its ends 455 into holes or loops formed in the legs of cart 400. Retaining pin 480 is inserted between retainer 450 and upper extension 460 to easily and releasably secure fuel supply tank 410 to cart 400. Advantageously, the present invention avoids the use of retaining nuts and bolts to secure fuel tank 410 to cart 400, which are found in conventional grills.

The grill of the present invention is optionally fitted with a rotisserie 500 shown in FIG. 14. Rotisserie 500 is preferably formed from a single sheet of aluminized steel and includes two end plates 510 and a front plate 520, which may preferably be formed in two sections 520A and 520B that are slidably engaged to one another. Step 15 in firebox 10 (shown best in FIG. 1) receives rotisserie 500 and holds it in place. End plates 510 each include a slot 530 to receive a conventional rotisserie spit and, if desired, motor, which resides outside firebox 10 and cover 20. Slots 510 may be vertically aligned or may be angled, as shown in FIG. 14, to better retain the spit in the rotisserie. End plates 510 also include angled tops 540 to abut the cover 20 as it approaches its closed position, thereby to close the grill from the environment even when the rotisserie is in use. If front plate 520 consists of two section, as noted above, the width of the rotisserie may be adjusted to permit its use in grills of different width.

Because it is a separate unit from the grill, the rotisserie 500 advantageously may be assembled with the food-carrying spit and motor away from the grill and inserted all at once into the grill. This permits the user to pre-heat the grill and to reduce heat loss upon adding the rotisserie unit, as well as carry the rotisserie in one piece from kitchen to grill, providing an advantage over conventional grills and rotisseries. The rotisserie also advantageously increases the cooking volume inside the grill because of its placement on the step between the firebox and cover and its elevation of the cover.

Figure 16:
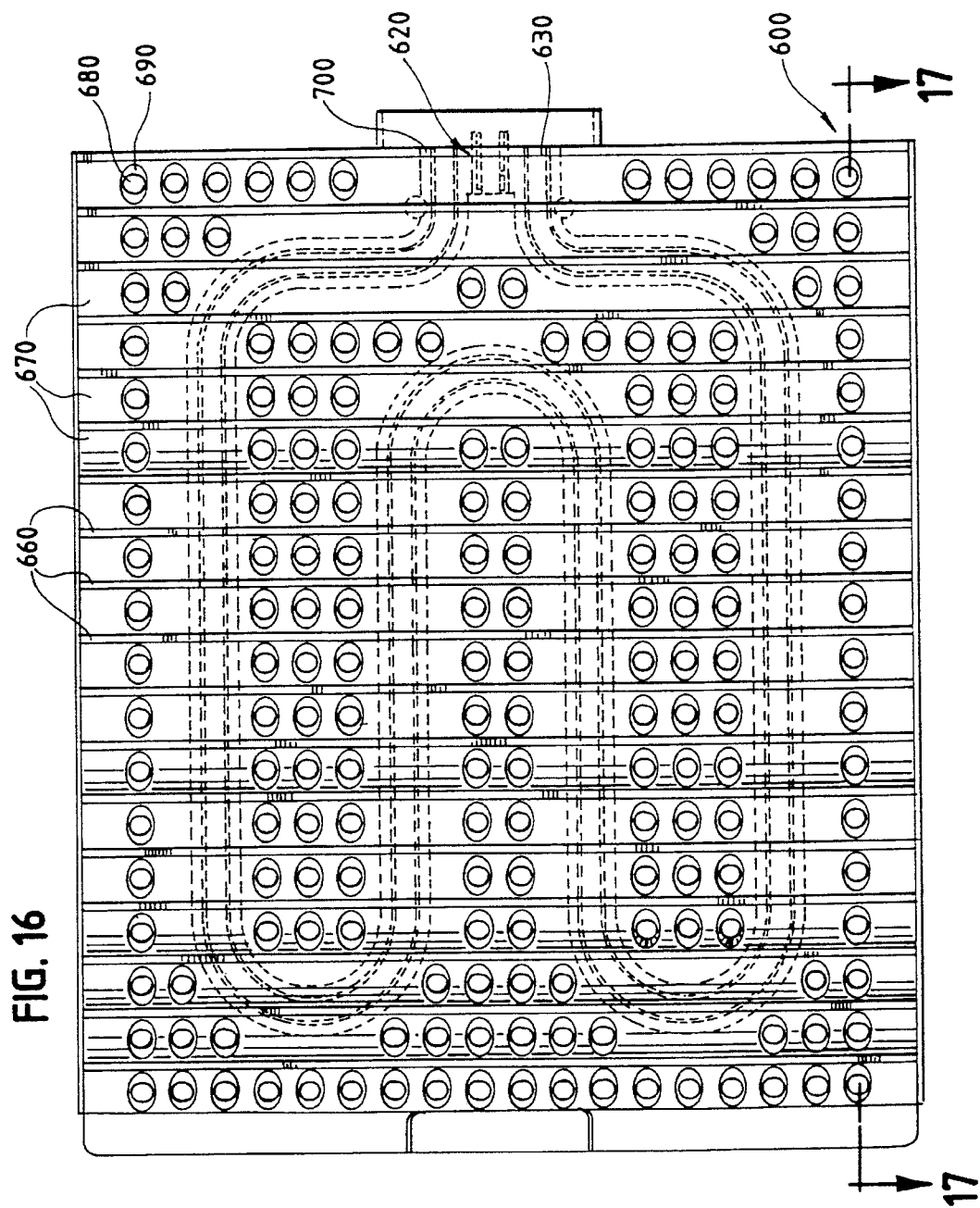
FIG. 16 is a top view of an electric cooking plate made in accord with another embodiment of the invention.
Figure 17:
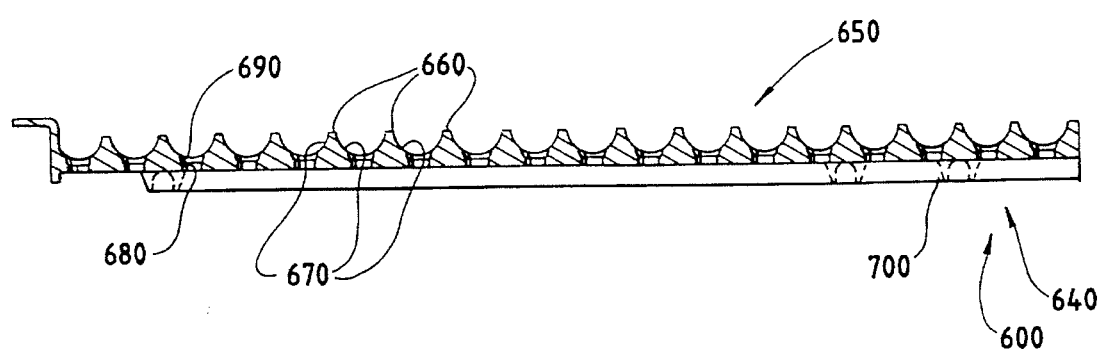
FIG. 17 is a cross-sectional view of the cooking plate shown in FIG. 16.
Figure 18:
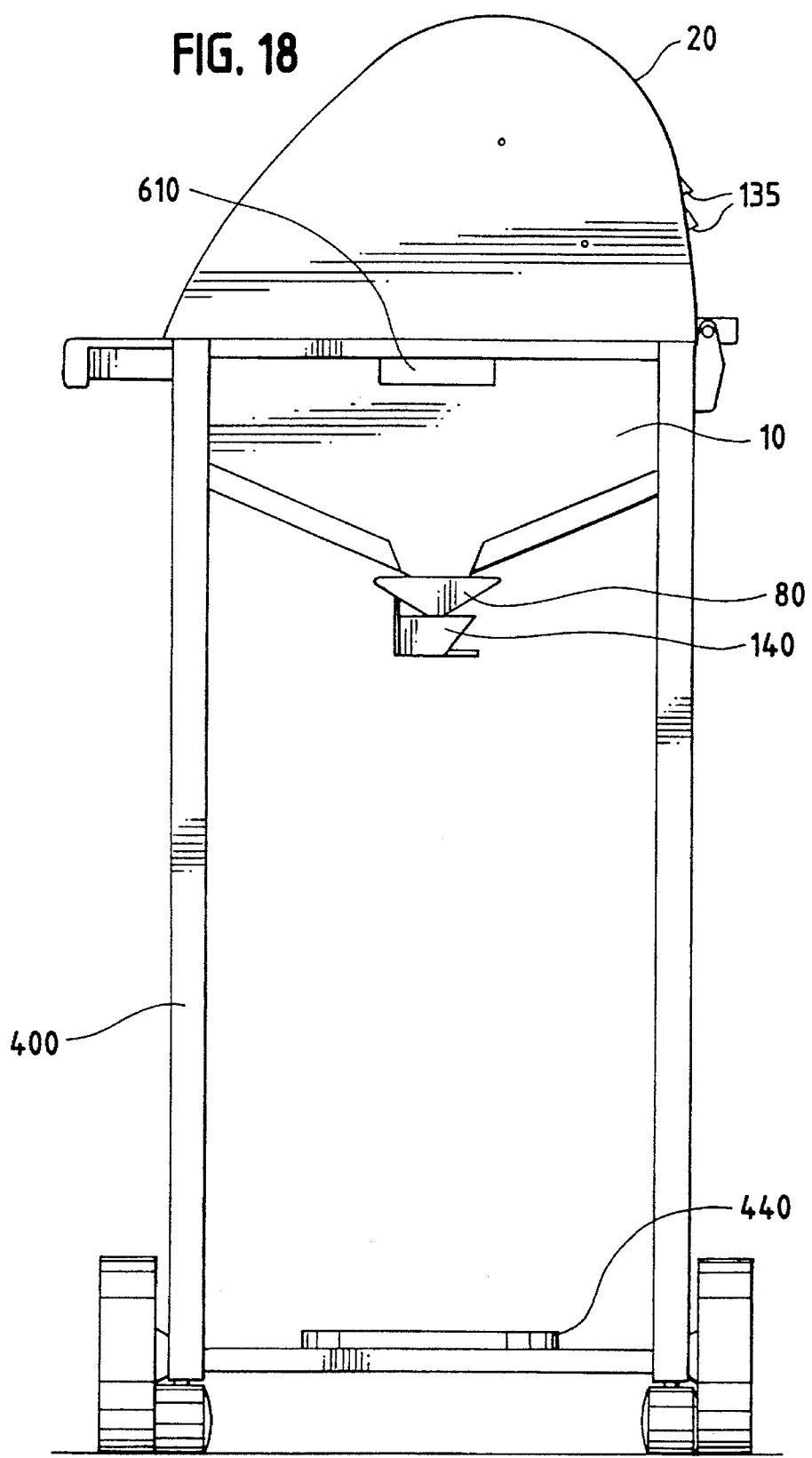
FIG. 18 is an end view of an alternative embodiment of the grill of the invention shown installed on a cart.

In an alternative embodiment of the invention, the grill is designed for use with an electric cooking plate 600 (shown in FIGS. 16 and 17) in place of grid 30. As a result, burners 200 are not used, and holes 150 are not needed in firebox 10. Instead, as shown in FIG. 18, firebox 10 includes aperture 610 for a power connection plug 620 to be connected to an electrical power control (such as that disclosed in commonly assigned, copending Graff U.S. patent application Ser. No. 08/044,873, filed Apr. 12, 1993, entitled "Temperature Feature Control Circuit," which is incorporated by reference herein), or to a power supply, as by a cable (not shown). Cooking plate 600 is preferably constructed from cast aluminum to provide efficient heat transfer between a heating element 630 on its lower surface 640 and food placed upon its upper surface 650 for cooking.

Electric cooking plate 600 includes on its upper surface 650 parallel ridges 660 and generally semi-circular, U-shaped troughs 670 extending between adjacent ridges 660. Within each trough are one or more holes 680 that extend through cooking plate 600. These holes permit grease and other cooking liquids to drain from the troughs 670 into firebox 10 in the manner generally described above with respect to cooking grid 30. Each of the holes 680 includes a beveled edge 690 tending to draw grease from the trough into the hole. Plate 600 is preferably coated with a nonstick, food-safe coating that will not degrade at operating temperature of more than 500° F., and is preferably the coating sold commercially under the name EXCALIBUR®.

On its lower surface 640, cooking plate 600 includes an electrical heating element 630. As shown best in FIG. 16, in the preferred embodiment, the plate 600 is cast with a channel 700 for receiving heating element 630 as an integral part of the plate. Heating element 630, which is preferably a steel resistance heating element of a desired wattage, is conformed to the contours of channel 700 and is inserted therein by pressing and staking, or other action, securely holding the heating element 630 within channel 700.

The present invention has been described with respect to certain embodiments and conditions, which are not meant to and should not be construed to limit the invention. Those skilled in the art will understand that variations from the embodiments and conditions described herein may be made without departing from the invention as claimed in the appended claims.

What is claimed is:

1. A barbecue grill for cooking food comprising:

a firebox, the firebox including angled lower walls for draining liquids coming from the food, wherein the firebox is made of heavy gauge steel to reduce energy loss through heat transfer;

a grease channel, connected to the lower portion of the firebox, for directing grease away from the firebox;

a cover pivotally attached to the firebox, wherein the cover is made of heavy gauge steel to reduce energy loss through heat transfer;

a cooking surface removably placed at the top of the firebox and securely held therein;

the cooking surface further comprising a generally sheetlike metal formed to define a plurality of inverted U-shaped crests for supporting food and V-shaped troughs being defined between the crests, wherein the cooking surface contains one or more holes in the troughs to permit grease to drip away from the cooking surface; and at least one gas burner for providing cooking heat;

the gas burner further providing a plurality of gas port perforations and wings, the grill being free of any structure or shielding apparatus between the gas burner and cooking surface.

2. The grill of claim 1, wherein the wings are below the gas port perforations when the burner is mounted in the grill.

3. The grill of claim 1, further comprising tabs extending from the grease channel and engaging slots defined in the firebox.

4. The grill of claim 1, wherein the steel is aluminized.

5. The grill of claim 1, wherein the steel is 22 gauge thickness to approximate the weight of cast aluminum.

6. The grill of claim 1, wherein the inverted U-shaped crests have an included cross section angle of approximately 60 degrees.

7. The grill of claim 1, wherein the V-shaped troughs have a notch cut out, thereby allowing the troughs to open directly into the firebox.

8. The grill of claim 1, wherein sufficient cooking surface metal is maintained between adjacent holes in a valley to allow some cooking liquids or grease to collect in the valley and on the metal so that collected liquids or grease can evaporate or burn and thereby enhance the flavor of the foods being cooked.

9. The grill of claim 1, wherein at least one gas burner contains a flattened end section adapted to engage a support slot formed in one of the walls of the firebox.

10. The grill of claim 1, further comprising a second gas burner and a tube interconnecting said one gas burner to the second burner.

11. The tube of claim 10, wherein the tube comprises gas and flame transmitting sections for lighting the second gas burner by propagating flame from the one gas burner across the tube to the second gas burner.

* * * * *